United States Patent
Rowley

(10) Patent No.: US 7,536,411 B2
(45) Date of Patent: *May 19, 2009

(54) DIRECTORY SERVER VIEWS

(75) Inventor: Pete Rowley, Ben Lomond, CA (US)

(73) Assignee: AOL LLC a Delaware limited liability company, Dulles, VA (US)

(*) Notice: Subject to any disclaimer, the term of this patent is extended or adjusted under 35 U.S.C. 154(b) by 420 days.

This patent is subject to a terminal disclaimer.

(21) Appl. No.: 11/428,360

(22) Filed: Jun. 30, 2006

(65) Prior Publication Data

US 2007/0005636 A1 Jan. 4, 2007

Related U.S. Application Data

(63) Continuation of application No. 10/051,065, filed on Jan. 16, 2002, now Pat. No. 7,213,018.

(51) Int. Cl.
*G06F 17/30* (2006.01)
(52) U.S. Cl. ....................................... 707/102
(58) Field of Classification Search ........... 707/3, 707/6, 10, 100, 102, 103 R, 103 X, 103 Y, 707/103 Z; 709/206, 219, 224; 717/101; 725/40, 87, 114
See application file for complete search history.

(56) References Cited

U.S. PATENT DOCUMENTS

| | | | |
|---|---|---|---|
| 5,530,849 A | 6/1996 | Hanushevsky et al. |
| 5,544,360 A | 8/1996 | Lewak et al. |
| 5,555,354 A | 9/1996 | Strasnick et al. |
| 5,671,381 A | 9/1997 | Strasnick et al. |
| 5,678,045 A | 10/1997 | Bettels |
| 5,768,578 A | 6/1998 | Kirk et al. |
| 5,812,135 A | 9/1998 | Kotchey |
| 5,826,254 A | 10/1998 | Kahn |
| 5,878,415 A | 3/1999 | Olds |
| 5,907,837 A | 5/1999 | Ferrel et al. |
| 5,973,695 A | 10/1999 | Walsh et al. |
| 5,999,179 A | 12/1999 | Kekic et al. |

(Continued)

FOREIGN PATENT DOCUMENTS

JP A 1993-225032 9/1993

(Continued)

OTHER PUBLICATIONS

Andrews, K. et al.; *Serving Information to the Web with Hyper-G*; 1995; Computer Networks and ISDN Systems, vol. 27, No. 6.

(Continued)

*Primary Examiner*—Diane Mizrahi
(74) *Attorney, Agent, or Firm*—Michael A. Glenn; Glenn Patent Group

(57) ABSTRACT

The invention provides directory views for a directory server to facilitate navigating entries hierarchically without requiring physical existence of the entry in any particular place. The entries are put into the directory views hierarchy using information about the entries. Given a set of views, a user can navigate using one of the views which is most appropriate to get to the entries that are required. Search of views in a directory server can be performed by a filter rewriting process.

1 Claim, 4 Drawing Sheets

U.S. PATENT DOCUMENTS

| | | | |
|---|---|---|---|
| 6,037,944 | A | 3/2000 | Hugh |
| 6,049,799 | A | 4/2000 | Mangat et al. |
| 6,061,740 | A * | 5/2000 | Ferguson et al. ............ 709/246 |
| 6,081,814 | A | 6/2000 | Mangat et al. |
| 6,112,024 | A | 8/2000 | Almond et al. |
| 6,144,962 | A | 11/2000 | Weinberg et al. |
| 6,154,213 | A | 11/2000 | Rennison et al. |
| 6,166,739 | A | 12/2000 | Hugh |
| 6,208,999 | B1 | 3/2001 | Spilo et al. |
| 6,230,173 | B1 | 5/2001 | Ferrel et al. |
| 6,243,093 | B1 | 6/2001 | Czerwinski et al. |
| 6,256,032 | B1 | 7/2001 | Hugh |
| 6,272,537 | B1 | 8/2001 | Kekic et al. |
| 6,275,852 | B1 | 8/2001 | Filepp et al. |
| 6,289,382 | B1 | 9/2001 | Bowman-Amuah |
| 6,292,795 | B1 | 9/2001 | Peters et al. |
| 6,484,177 | B1 * | 11/2002 | Van Huben et al. ............ 707/10 |
| 6,871,245 | B2 * | 3/2005 | Bradley ........................ 710/65 |
| 7,043,378 | B2 * | 5/2006 | Peters ......................... 702/57 |
| 7,043,472 | B2 * | 5/2006 | Aridor et al. .................... 707/3 |
| 7,140,015 | B1 * | 11/2006 | Bhanjois et al. ............. 718/100 |
| 7,251,693 | B2 * | 7/2007 | Stull et al. ................... 709/225 |
| 7,343,378 | B2 * | 3/2008 | Marcjan ..................... 707/101 |
| 7,370,061 | B2 * | 5/2008 | Chakraborty et al. ....... 707/102 |
| 2001/0034733 | A1 | 10/2001 | Prompt et al. |
| 2002/0169767 | A1 | 11/2002 | Harvey |
| 2002/0194165 | A1 | 12/2002 | Smith |
| 2003/0233365 | A1 * | 12/2003 | Schmit et al. ............... 707/100 |
| 2006/0173873 | A1 * | 8/2006 | Prompt et al. ............... 707/100 |
| 2008/0209491 | A1 * | 8/2008 | Hasek ......................... 725/114 |

FOREIGN PATENT DOCUMENTS

| | | |
|---|---|---|
| JP | A 1998-177584 | 6/1998 |
| JP | A 2000-112797 | 4/2000 |

OTHER PUBLICATIONS

Meng, X. et al.; *Data Visualization, Indexing and Mining Engine—A Parallel Computing Architecture for Information Processing over the Internet*; Feb. 1998; Dept. of Computer Science, Univ. of Texas—Pan American.

Stonebraker, M. et al.; *The Implementation of Postgres*; EECS Dept., Univ. of CA Berkeley.

"WinFS—Means Windows Future Storage"; http://www.computerperformance.co.uk.

T. Kitakaku, et al., "An Information Navigation System Utilizing Distributed Geographical Information," Dec. 15, 2001, IPSJ Journal, Information Processing Society of Japan, vol. 42, No. Sig15 (TOD 12), pp. 30-39.

Y. Hasegawa, et al., "View Definition for Directory Tree using Set Operations," Jan. 23, 1999, IPSJ SIG Technical Report, Information Processing Society of Japan, vol. 99, No. 6 (99-DBS-117-3), pp. 13-18.

Koji Kumagai, "N+I Speaker's Forum 3rd, Directory Service, What Will Follow Next?" Jun. 1, 2000, Interop Magazine, vol. 10, No. 6, pp. 112-115, Softbank Publishing Inc.

Rui, J.P. Jose, et al., "Providing Multiple External Views on directory User Interface," Feb. 1996, Computer Networks and ISDN Systems, Elsevier Science B.V., vol. 28, Issue 4, pp. 543-550.

T. Hirosawa, et al., "Proposal of an Electronic Mail System Working in Cooperation with a Directory Server Using Mail-Address Viewer," Dec. 15, 2001, IPSJ Journal, Information Processing Society of Japan, vol. 42, No. 12, pp. 2847-2859.

F. Ukai, "Use LDAP Authentication, Part 1 LDAP Introduction," Jan. 1, 2002, Unix User, Softbank Publishing, Inc., vol. 11, No. 1, pp. 26-31.

Chen, M., M. Hearst, J. Hong, and J. Lin; Cha-Cha: *A System for Organizing Intranet Search Results*; Oct. 11-14, 1999; The 2nd USENIX Symposium on Internet Technologies and Systems, Boulder CO USA.

Kulkami, D., A. Banerji, M. Casey, and D. Cohn; *Information Access in Mobile Computing Environments*; 1993; University of Notre Dame.

Mendelzon, Alberto; *Visualizing the World Wide Web*; 1996; ACM Proc. Of the Workshop on Advanced Visual Interfaces, pp. 13-19.

Rennison, E.; "Galaxy of News"; 1994; ACM Symposium on User Interface Software & Technology, pp. 3-12.

WinFX=Windows Frameworks, retrieved on Jun. 14, 2004 from website: http://www.computerperformance.co.uk.

King, R. et al, "Sybil: Supporting Heterogenous Database Interoperability with Lightweight Alliances (draft)", 1997; Dept. of Computer Science, Univ. of Colorado, Boulder, CO. USA, presented at the 1997 Next Generation Information Technologies and Systems (NGITS) Conference, Israel.

Assmann, U, Dr., "Configuration Management, Research Center for Integrational Software Engineering", Jun. 2004; RISE.

Pu, C., The Superdatabase Architecture: Cooperative Heterogenous Transactions, 1990; Dept of Computer Science, Columbia University, N.Y., N.Y. USA.

Silva, A. et al; Organizational Management System in an Heterogenous Environment—a WWW case study; 1995; Proc. Of the 1995 Intl Workshop on Hypermedia Design.

* cited by examiner

DIRECTORY SERVER VIEWS

CROSS REFERENCE TO RELATED APPLICATION

This Application is a Continuation of and claims priority to U.S. application Ser. No. 10/051,065, filed 16 Jan. 2002, now issued as U.S. Pat. No. 7,213,018 B2, which is incorporated herein in its entirety by this reference thereto.

BACKGROUND OF THE INVENTION

1. Technical Field

The invention relates generally to a directory service. More particularly, the invention relates to a system and method of creating directory server views and using them to navigate entries in a directory server.

2. Description of the Prior Art

A directory service is a structured repository of information about people and resources within an organization that facilitates management and communication within the organization. On a local area network (LAN) or a wide area network (WAN), the directory service identifies all aspects of the network including users, software, hardware, and the various rights and policies assigned to each. As a result, applications access information without knowing where a particular resource is physically located and users interact oblivious to the underlying network topology and protocols.

To allow heterogeneous networks to share directory information, the International Telecommunications Unions (ITU) has proposed a common structure called "X.500," which is a set of standards covering electronic directory services such as "white pages," "Knowbot," and "whois". However, its complexity and lack of seamless Internet support led to the development of Lightweight Directory Access Protocol (LDAP), which has continued to evolve under the aegis of the Internet Engineering Task Force (IETF).

LDAP has been adopted by many companies, such as America Online Inc. (Netscape Directory Server) and has become a de facto standard for directory services. Other LDAP compatible offerings include Novell, Inc.'s Novell Directory Services (NDS)™ product and Microsoft Corporation's Active Directory™ product. The Netscape and Novell products are available for Windows NT™ and Unix™ platforms. Novell Directory Services also run on Novell platforms. Microsoft Corporation's Active Directory is an integral part of Microsoft's Windows 2000™ product and, although it can interface with directory services running on other systems, it is not available for other platforms.

Directory service has been widely used in various areas because it provides a standard way to add, update, and retrieve information entries stored in a central or distributed storage place. For example, using LDAP, any client compliant to the LDAP standard can communicate with any directory server compliant to the same LDAP standard.

There is, however, a problem in the deployment of a directory server in that a user is limited to choose either a flat directory information tree or a hierarchical directory information tree. On the one hand, if the user chooses to create a flat directory information tree, it becomes inconvenient to navigate the entries in the directory. On the other hand, if the user chooses to create a hierarchical directory information tree that is useful in navigating the directory, it becomes inconvenient to respond to a need to change the hierarchy.

It would be advantageous to provide a directory server that can create arbitrary hierarchies that are mapped to entries without the need to move the entries in the directory.

It would also be advantageous to keep any changes to the directory server structure to be transparent to any client of the directory server.

It would also be advantageous to facilitate a structured directory information tree in the directory server.

SUMMARY OF THE INVENTION

The preferred embodiment of the invention provides a technique for hierarchically navigating entries in a way that does not require the physical existence of the entry in any particular place, and which uses information about the entries to place them in the views hierarchy. Given a set of directory views, a user can navigate using one of the directory views that makes the most sense to get to the entries required.

In one preferred embodiment of the invention, a method for navigating entries hierarchically in a directory server by creating and using directory views is illustrated. The entries do not need to be physically in any particular place. The directory server may have a flat directory information tree. The existence of the directory views is transparent to a client of the directory server and the client is not required to have special knowledge of the directory views to use them.

Each of the directory views begins with an ordinary entry. The presently preferred method comprises the steps of:

Creating one or more directory views;

Organizing the directory views into a hierarchy using information about the entries; and Using one of the directory views that is best suited for navigating to the entries.

Each of the directory views belongs to a specific object class that contains a filter attribute. This filter attribute contains a filter that describes the views. The filter attribute may be omitted from the views to facilitate a hierarchical directory structure. Each of the directory views may have sub-views which provide a subset of the views. The sub-views may have different subject domains from the directory views.

In another preferred embodiment, a method to search the directory views in the directory server by rewriting filter is provided. The method comprises the steps of:

Rewriting the given filter to be a sub-tree search of the parent of the top most view in the view hierarchy; and Performing the sub-tree search with the rewritten filter.

In this method, the directory entries do not need to be physically in any particular place. The directory server may have a flat directory information tree. The existence of the views is transparent to a client of the directory server and the client requires no special knowledge of the views to use them. Each of the directory views begins with an ordinary entry. Each of the directory views belongs to a specific object class that contains a filter attribute. This filter attribute contains a filter that describes the directory views. The filter attribute may be omitted from the directory views to facilitate a hierarchical directory structure. Each of the directory views may have sub-views which provide a subset of the views. The sub-views may have different subject domains from the directory views.

In some embodiments, the rewriting step in the above illustrated method further comprises the steps of:

(a) Collecting filters from the view and all ancestor views of the view to form a first sub-filter;

(b) If the search is not a sub-tree search, collecting all filters from all descendent views to form a second sub-filter;

(c) Adding a third sub-filter to ensure all children of the view are included in the search for one level search or ensure all descendents of the view are included for a sub-tree search; and (d) Combining the sub-filters from steps (a)-(c) and the given filter to produce the rewritten filter.

Step (a) further comprises the steps of:
(1) Starting from the top most view and working down;
(2) Adding each filter to the first sub-filter in step (a) using the logical AND operator; and
(3) Moving down the hierarchy and going to step (2) until at the view.

Step (b) further comprises the steps of:
(1) Working down the hierarchy until the hierarchy ends;
(2) Adding each filter to the second sub-filter in step (b) using the logical AND operator and the logical NOT operator; and
(3) Repeating step (2) until all sub-views of the view have been accounted for.

Step (c) further comprises the steps of:
(1) For sub-tree searches, using the logical OR operator and a filter which includes the components of the descendent views' distinctive attributes, and which excludes the distinctive attribute of the view;
(2) For one level searches, using the logical OR operator and a filter which includes the components of the children views' distinctive attributes, and which excludes the relative distinctive attribute of all children views of the view using the logical NOT operator; and
(3) For base searches, using the filter "objectclass=nsview", wherein "nsview" is the object class of the views.

Step (d) further comprises the steps of:
(1) Combining the third sub-filter from step (c) with the given search filter using the logical AND operator;
(2) Combining the first sub-filter from step (a) and the second sub-filter from step (b) with the given search filter using the logical AND operator;
(3) Combining the resulting filters from steps (1) and (2) using the logical operator OR.

The sub-filters from steps (a), (b) and (c) may be cached so that the filter rewriting only needs to perform step (d), which amounts to simple filter concatenation.

In another preferred embodiment of the invention, a directory server for managing directory information is provided. The directory server comprises:

A plurality of directory entries; and
A set of directory views to facilitate hierarchical navigation of the directory entries.

The directory entries do not need to be physically in any particular place. The directory server may further comprise a flat directory information tree. It may further comprise a means to search the directory views by rewriting filters. The existence of the directory views is transparent to a client of the directory server and the client is not required to have special knowledge of the directory views to use them. Each of the directory views begins with an ordinary entry. Each of the directory views belongs to a specific object class that contains a filter attribute. The filter attribute containing a filter that describes the directory views. The filter attribute may be omitted from the views to facilitate a hierarchical directory structure. Each of the directory views may have sub-views that provide a subset of the directory views. The sub-views may have different subject domains from the directory views.

DETAILED DESCRIPTION OF THE INVENTION

A directory server view is a technique to navigate entries hierarchically in a manner which does not require the physical existence of the entry in any particular place, and which uses information about the entries to place them in the views hierarchy. When a set of views are realized on a directory, a user can navigate using one of the views which is most appropriate to get to the entries that are required.

For example, if the user's target entries are those which dwell in Mountain View, then the view that is most appropriate is perhaps the one that starts out navigating down using location-based information. If the target entry is an organizational question, however, the organization view may be the best. Both views exist in the directory server at the same time and operate on the same set of entries. They have different concerns when displaying their version of the directory structure.

Therefore, the directory server views can be regarded as a virtual directory information tree. When a directory server is deployed with the directory views of the invention, any directory structure other than a flat directory information tree is unnecessary.

One way to create a set of hierarchies is to use the innate ability of the directory to use them. In the following preferred embodiment, the features inherent in the directory to realize views, namely its hierarchical directory information tree and its ability to search by filter are used.

Each view begins with an ordinary entry such as an "nsContainer" or "organizationalunit" object. The entry has certain required characteristics including (1) the object class ns-view specifying that the entry is a directory view, and (2) the attribute ns-view-filter.

A view may have sub-views that provide a subset of the parent view. There is no restriction on conventional entries being contained in a view. However, one might consider redirecting entries created in a view to a parent of the top most view, perhaps with certain logic to populate the necessary attributes so that it appears in the view it was intended. To facilitate hierarchical organization, a view may omit the ns-view-filter attribute, in which case no view processing occurs for one level searches on that view.

Figure 1:
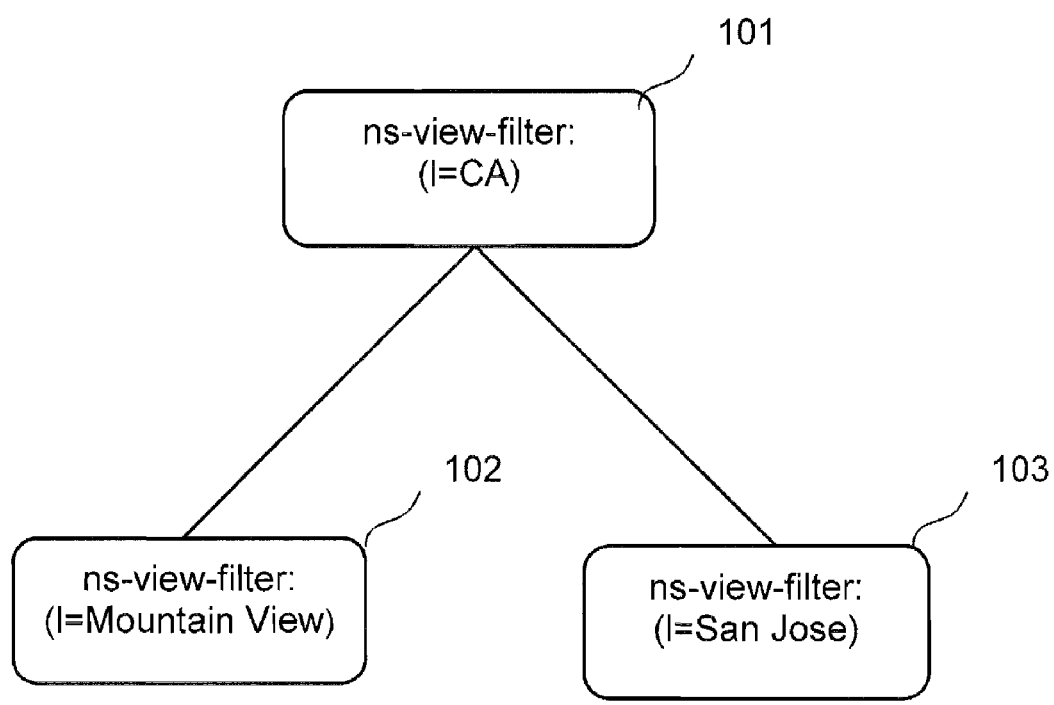
FIG. 1 is a block diagram illustrating a sample directory view hierarchy.

Referring to FIG. 1, illustrated is an exemplary directory view hierarchy. It comprises a parent view 101, which has an ns-view-filter of "(l=CA)". The parent view 101 contains two sub-views: view 102 which has an ns-view-filter of "l=Mountain View", and view 103 which has an ns-view-filter of "l=San Jose".

The attribute ns-view-filter is expected to contain an administrator created filter which describes the view. For example, the top of a location base view may have a value of "c=USA", and an organization based one may have a value of "(&(dc=netscape) (dc=com))".

When a search is performed on the view and before processing begins on the search, the search is re-written. Note that the base of the search must refer to a directory view or no view processing is to occur. The search is re-written to be the parent of the top most view in the view hierarchy. The search type is re-written to be a sub-tree search. The search filter is re-written to perform the correct search to realize the view.

Figure 2:
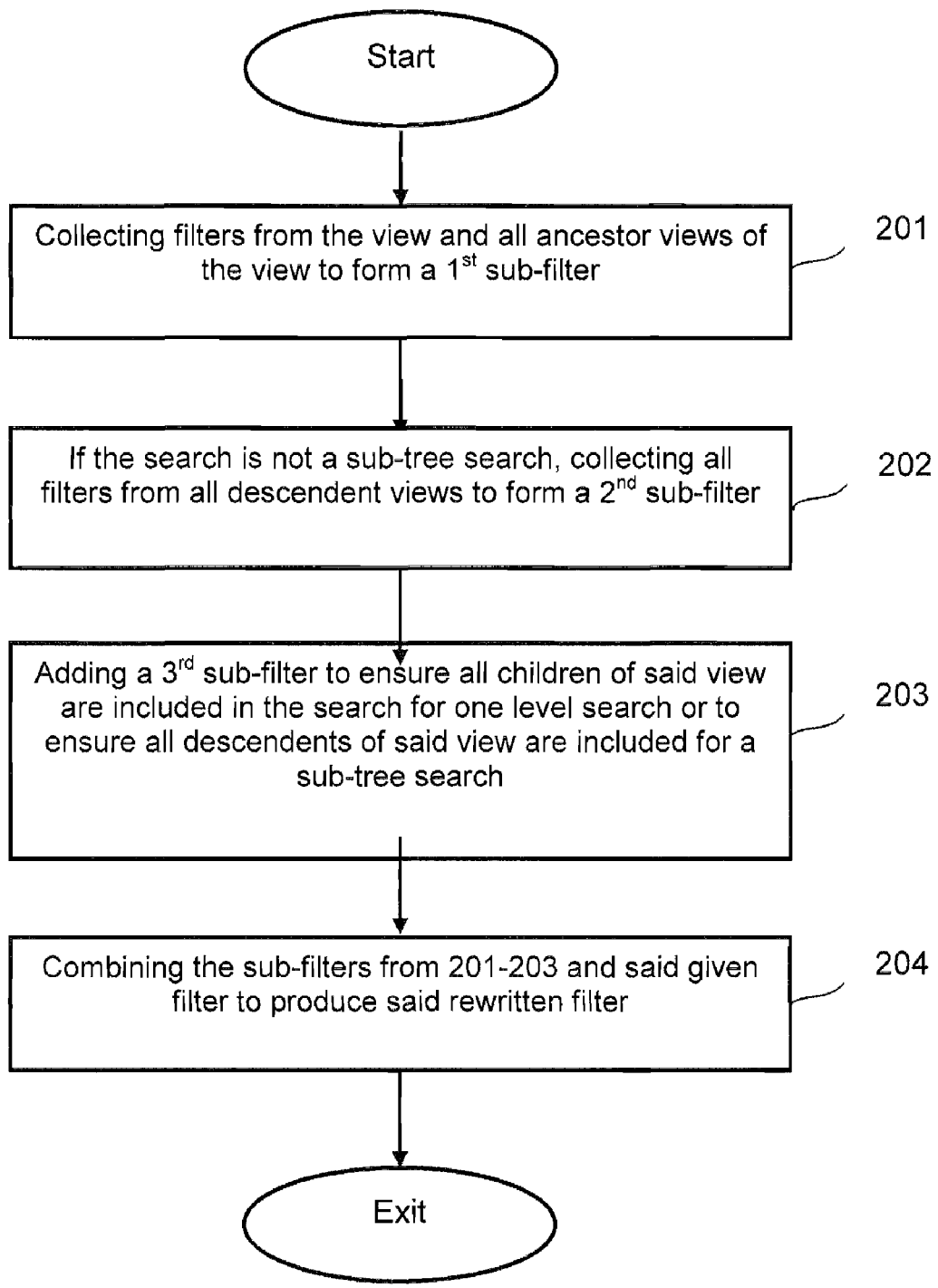
FIG. 2 is a flowchart illustrating the steps to rewrite filter when searching a view.

Referring to FIG. 2, the following steps for the re-writing of the filter are illustrated:

Step 201: Collecting filters from the view and all ancestor views of the view to form a sub-filter.

Step 202: If the search is not a sub-tree search, collecting all filters from all descendent views to form another sub-filter.

Step 203: Adding a further filter to ensure all children of the view are included in the search for one level search or adding a further filter to ensure all descendents of the view are included for a sub-tree search.

Step 204: Combining filters from steps 201-203 and the given filter to produce the rewritten filter.

Figure 3:
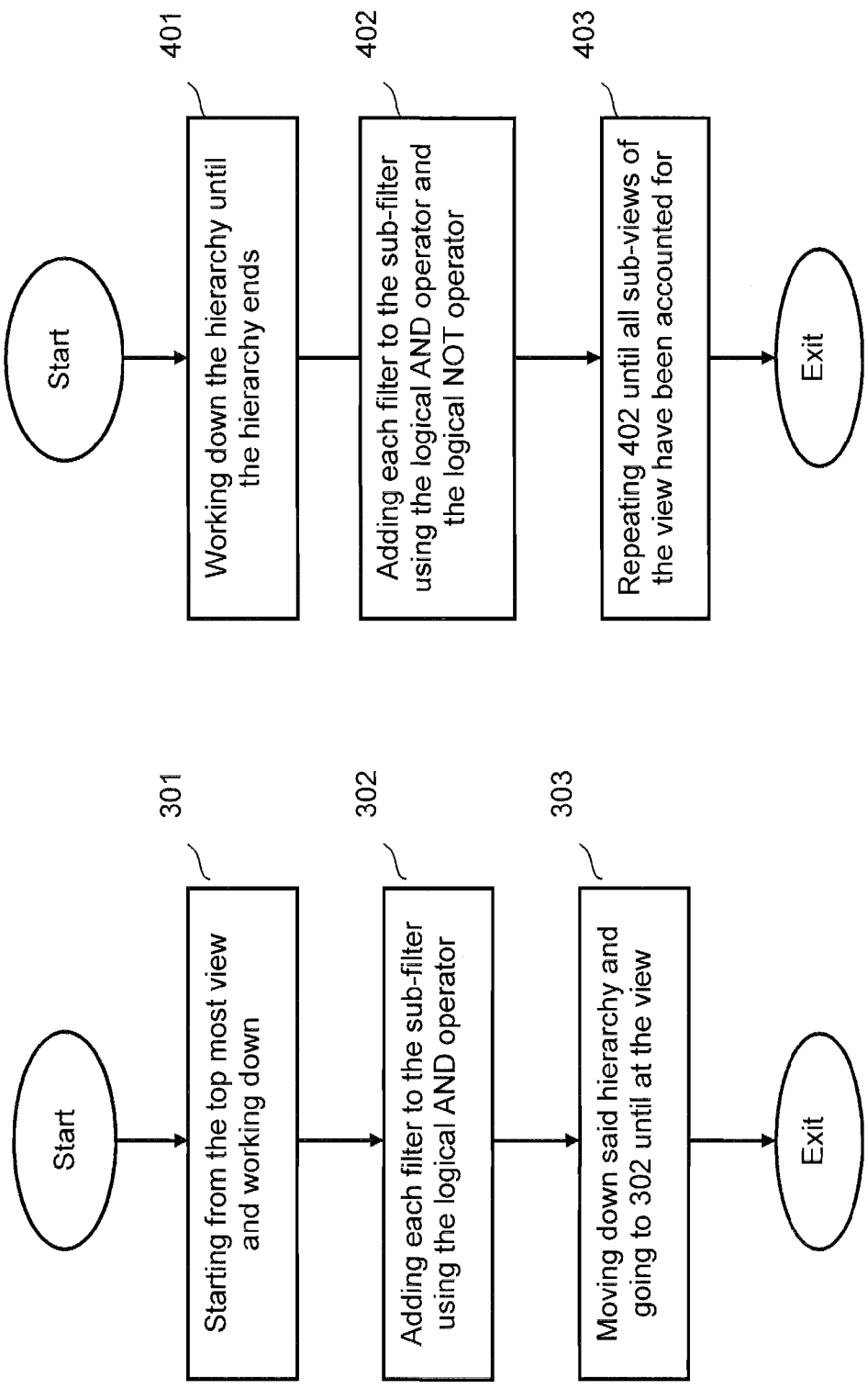
FIG. 3 is a flowchart illustrating details of step 201 in FIG. 2.

FIG. 3 further illustrates the steps for processing step 201:

Step 301: Starting from the top most view and working down.

Step 302: Adding each filter to the sub-filter using the logical AND operator.

Step 303: Moving down the hierarchy and going to step 302 until at the view.

Figure 4:
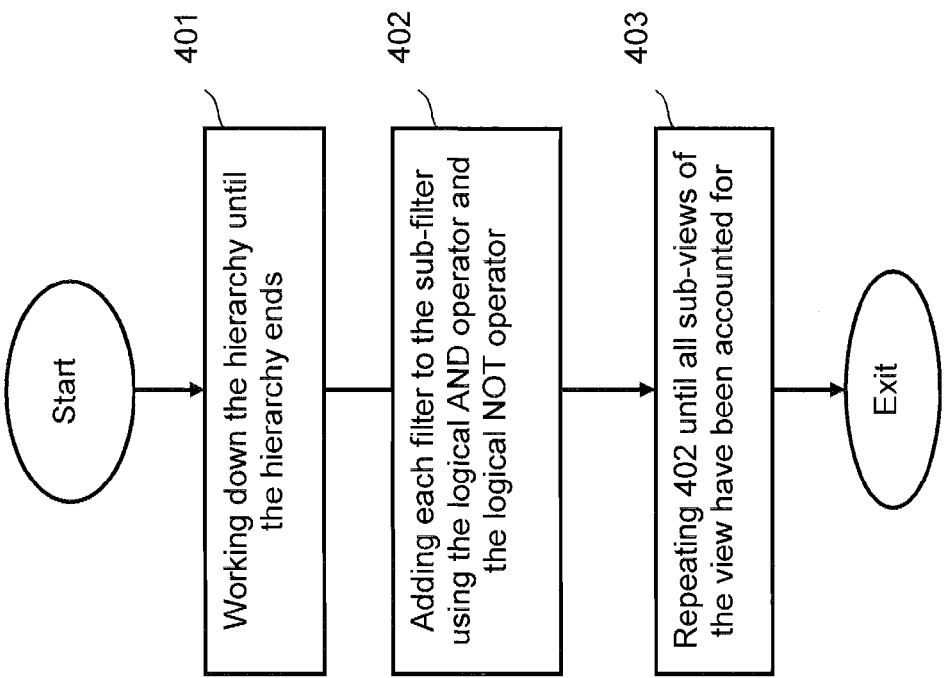
FIG. 4 is a flowchart illustrating details of step 202 in FIG. 2.

FIG. 4 further illustrates the steps for processing step 202:

Step 401: Working down the hierarchy until the hierarchy ends.

Step 402: Adding each filter to the sub-filter using the logical AND operator and the logical NOT operator.

Step 403: Repeating step 402 until all sub-views of the view have been accounted for.

Figure 5:
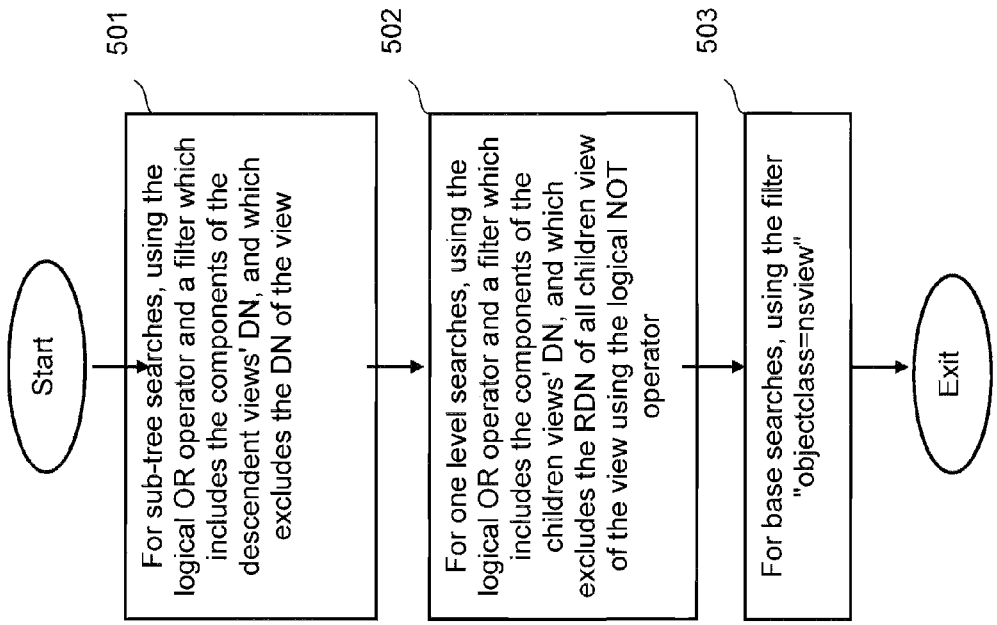
FIG. 5 is a flowchart illustrating details of step 203 in FIG. 2.

FIG. 5 further illustrates the steps for processing step 203:

Step 501: For sub-tree searches, using the logical OR operator and a filter which includes the components of said descendent views' distinctive attributes (DN), and which excludes the DN of the view.

Step 502: For one level searches, using the logical OR operator and a filter which includes the components of the children views' DN, and which excludes the RDN of all children view of the view using the logical NOT.

Step 503: For base searches, using the filter "objectclass=nsview".

Figure 6:
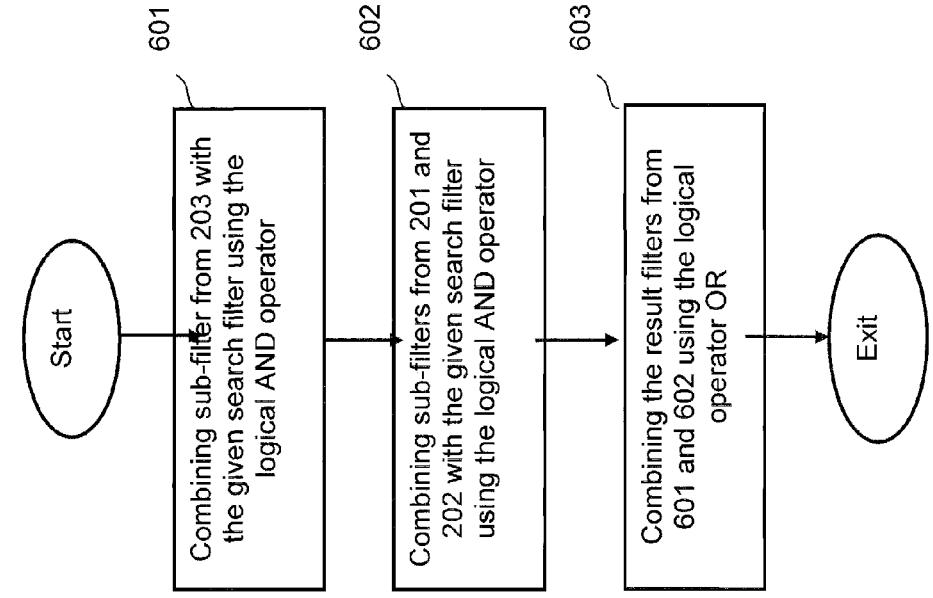
FIG. 6 is a flowchart illustrating details of step 204 in FIG. 2.

FIG. 6 further illustrates the steps for processing step 204:

Step 601: Combining sub-filter from step 203 with the given search filter using the logical AND operator.

Step 602: Combining sub-filters from steps 201 and 202 with the given search filter using the logical AND operator.

Step 603: Combining the result filters from steps 601 and 602 using the logical operator OR.

It can be seen that using this method, any search can be re-written to conform to a certain view of the directory tree, no matter how that tree is laid out or how complex the view is.

Also note that views are aware of their placement in the directory tree and can be applied to certain branches. For example, if the user is still using a structured directory information tree, a locality based view might be placed under "ou=sales" so that sales people can be found by location.

The system design allows for caching of filters which essentially do not change often, if at all, throughout the life of the server invocation. Having cached these filters, there is no need to analyze all descendants of a view to add them to a filter during a search operation. The filters that can be cached include these resulting from steps 201-204. This leaves step 204 as the only work to be done during a search, which amounts to simple filter concatenation, as in known to those skilled in the art.

One distinct feature of the invention is that the directory server views look like any other entry, and their hierarchies look like any other hierarchy. The fact that a view is a view is transparent to the client application and requires no special knowledge of the views to use them. This attribute means that they can be put to work in existing installations and can be used by existing custom clients and third party vendor clients alike, including the command line utilities shipped with the directory server.

Due to the ease of adding new views or re-organizing existing view hierarchies, a flat directory information tree and a set of views means that administrators need no longer be concerned by the company reorganizations and the work they create in the directory.

Though all of the examples presented thus far have suggested that sub-views are similar to a hierarchical drilling down within one subject domain, such as location, it would be just as feasible to switch the subject of the view. For instance, a location-based view may at the city level continue on by offering a choice of views for departments, buildings and maybe even favorite drink.

The herein disclosed directory views open up many opportunities to solve problems for the users and add value to directory server vendors. With the invention, the user only need a flat directory information tree and a set of views to facilitate directory navigation, and relieve the problem of users who have hierarchical directory information trees that must change by adding another view. The invention also offers more than one way to view the directory entries, and thus adds flexibility to working practices when compared to a static model.

The invention may be embodied in other automated tools that can be used by anyone desiring to continue interrupted sessions in a stateless network, whether such sessions are business-related, recreational, informational, or otherwise.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A computer implemented directory server apparatus containing heterogeneous directory entries and a directory views hierarchy, each view containing a filter describing said view, comprising:

a digital data processor programmed to perform operations to search a given view in said directory views hierarchy with a given filter;

said operations including:

(a) collecting filters from said given view and all ancestor views of said given view to form a first sub-filter;

said digital data processor rewriting said given filter using said first sub-filter to be a sub-tree search of the parent of the topmost view in said view hierarchy; and performing said sub-tree search with said rewritten filter, wherein each of said directory views belongs to a specific object class that contains a filter attribute, said filter attribute containing a filter that describes said directory views;

wherein said rewriting operation comprises:

(b) when the search is not a sub-tree search, collecting all filters from all descendent views to form a second sub-filter;

(c) adding a third sub-filter to ensure all children of said given view are included in the search for one-level search and to ensure all descendents of said given view are included for a sub-tree search; and (d) combining said first sub-filter, said second sub-filter, and said third sub-filter and said given filter to produce said rewritten filter;

wherein operation (a) further comprises:
- (a1) starting from the topmost view and working down;
- (a2) adding each filter to said first sub-filter in operation (a) using the logical AND operator; and
- (a3) moving down said hierarchy and going to operation (a2) until at said given view;

wherein said operation (b) further comprises:
- (b1) working down said hierarchy until said hierarchy ends;
- (b2) adding each filter to said second sub-filter in said operation (b) using the logical AND operator and the logical NOT operator; and
- (b3) repeating said operation (b2) until all sub-views of said given view have been accounted for; and wherein said operation (c) further comprises:
- (c1) for sub-tree searches, using the logical OR operator and a filter that includes components of distinctive attributes of said descendent views, and that excludes the distinctive attribute of said given view;
- (c2) for one-level searches, using the logical OR operator and a filter which includes the components of distinctive attributes of said children views, and which excludes the relative distinctive attribute of all children views of said given view using the logical NOT operator; and
- (c3) for a location based search, using a filter "objectclass=nsview", wherein "nsview" is the object class of said directory views.

* * * * *